Nov. 1, 1966 — S. S. D. JONES — 3,283,325
DIRECTIVE TRANSMITTER SYSTEM FOR AIRCRAFT RUNWAY APPROACH
Filed June 10, 1963 — 4 Sheets-Sheet 1

Spencer Seith Duniam Jones
Inventor
By Moore, Hall & Pollack
Attorney

Nov. 1, 1966 S. S. D. JONES 3,283,325
DIRECTIVE TRANSMITTER SYSTEM FOR AIRCRAFT RUNWAY APPROACH
Filed June 10, 1963 4 Sheets-Sheet 2

Spencer Selth Duniam Jones
Inventor

Nov. 1, 1966

S. S. D. JONES 3,283,325

DIRECTIVE TRANSMITTER SYSTEM FOR AIRCRAFT RUNWAY APPROACH

Filed June 10, 1963

Spencer Selth Dunism Jones
Inventor
By Moore, Hall &
Pollock
Attorney

United States Patent Office 3,283,325
Patented Nov. 1, 1966

3,283,325
DIRECTIVE TRANSMITTER SYSTEM FOR AIRCRAFT RUNWAY APPROACH
Spencer Selth Duniam Jones, Farnborough, England, assignor to the Minister of Aviation in Her Majesty's Government of the United Kingdom of Great Britain and Northern Ireland, London, England
Filed June 10, 1963, Ser. No. 286,848
Claims priority, application Great Britain, June 13, 1962, 22,673/62
24 Claims. (Cl. 343—107)

The present invention relates to aircraft approach and landing systems.

According to the present invention there is provided an aircraft approach system including a transmitting aerial for transmitting two signals having the same carrier frequency but differently modulates. Said aerial is located at the downwind end of an aircraft runway and includes a plurality of elements spaced transversely of the runway. Means are provided for feeding the signals to the aerial whereby the rate of change of the difference of depth of modulation across the extended center line of the runway at ranges less than, in the order of, and greater than the Rayleigh distance is sufficiently large for an approaching aircraft to be located in azimuth on the extended center line of the runway.

According to an aspect of the invention an aircraft approach system is provided with an aerial array for transmiting two differently modulated signals having the same carrier frequency. The array includes a plurality of aerial elements spaced in a straight line, and means are provided for feeding the two signals to the array whereby a lobe of one of the two signals is emitted on one side of the perpendicular bisector of the straight line and a lobe of the other of the two signals is emitted on the other side of the perpendicular bisector of the straight line in such a way that the rate of change of the difference of depth of modulation across the perpendicular bisector at ranges less than, in the order of, and greater than the Rayleigh distance is sufficiently large for an approaching aircraft to be located in azimuth on the perpendicular bisector.

The "downwind end of the runway" as used hereinafter, and in the appended claims, means that end of the runway from which an aircraft approaches to land.

The Rayleigh distance is described and defined below.

Embodiment of the invention will be described by way of example with reference to the accompanying drawings in which.

Figure 1:
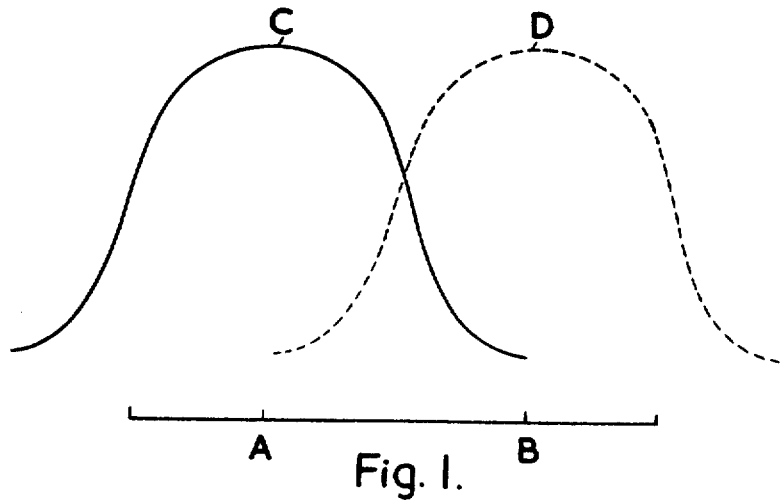
FIGURE 1, FIGURE 2 and FIGURE 3 are graphs showing the relative strength of transmitted signals plotted against distance transverse of the runway.

Those skilled in the art are well acquainted with the British Instrument Landing System. This system includes a localizer to define the path along which an aircraft should be flown in order to be aligned with the center line of the runway. The localizer is currently formed by the intersection of two overlapping transmitted radio beams. The beams have carrier frequencies of between 108 mc./s. and 112 mc./s., but one beam is modulated with a 90 c./s. frequency and the other beam is modulated with a 150 c./s. frequency. When an aircraft is on the center line of the runway, it will receive each signal with equal strength; but when it deviates from the center line, one signal or the other will predominate according to the sense of deviation. FIGURE 1 is a graph showing the relative strengths of the two frequencies plotted against distance transverse of the runway, and relates to an aircraft approaching the runway and about a mile away from it. Two points A and B, designate the extremities of the runway. A curve C represents the relative strength of the 150 c./s. modulated signal, and a curve D represents the relative strength of the 90 c./s. modulated signal. It will be observed that an aircraft deviating from the center line of the runway will experience a large relative change in intensities of the two signals. This change in the intensities is known in the art as the difference of depth of modulation, or the D.D.M., and is expressed arithmetically as the percentage modulation depth of the larger signal minus the percentage modulation depth of the smaller signal divided by 100.

For a sensitive system, the rate of change of the D.D.M. across the extended center line of the runway must be sufficiently large. This rate of change will hereinafter be called the control characteristic of the system. It will be seen that the control characteristic of the system to which FIGURE 1 applies is satisfactorily large.

Figure 2:
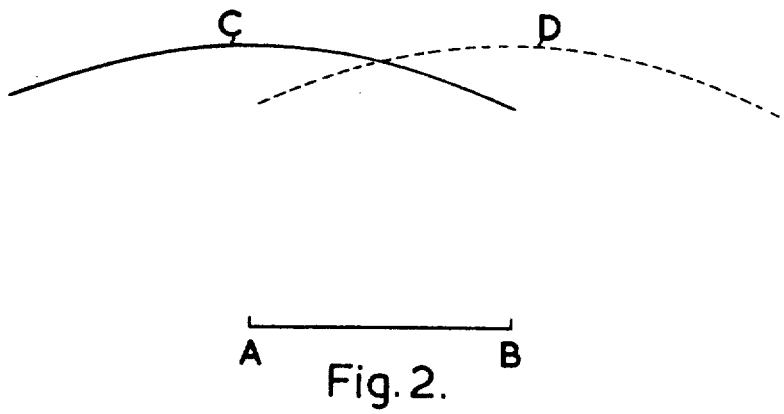

When the aircraft is closer to the aerial, however, FIGURE 1 does not apply. The reason is that, below a distance known as the Rayleigh distance, the angle subtended by the aperture of the aerial at the aircraft is no longer negligible and the phase front of the radio wave is therefore no longer spherical. The Rayleigh distance is given by $R = L^2/\lambda$ where R is the Rayleigh distance, L is the aperture of the aerial and $\lambda$ is the wavelength of the radio wave. Below the Rayleigh distance the relative strengths of the signals are as shown in FIGURE 2. As can be seen from this Figure, the control characteristic is smaller, i.e., a small deviation by the aircraft from the center line of the runway will not make a great difference in the D.D.M. This effect is analagous to backlash, and occurring, as it does, close to the runway is very undesirable.

In the embodiments to be described, however, the aerial is located at the downwind end of the runway. The aperture of the aerial is of the order of 300 feet, and the Rayleigh distance is of the order of one mile. Thus the aircraft will be at a range less than the Rayleigh distance for a considerable time before it touches down. The aerial and the associated transmitters are so designed that the control characteristic of the system is satisfactory at all ranges within a given range and in a given direction within the width of the runway.

Figure 3:
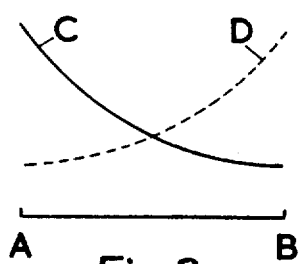

In one embodiment, the aerial is a linear array fed from both ends and having a relationship between the relative strengths of the transmitted signals, measured at a point whose range is less than the Rayleigh distance as shown in FIGURE 3.

Figure 4:
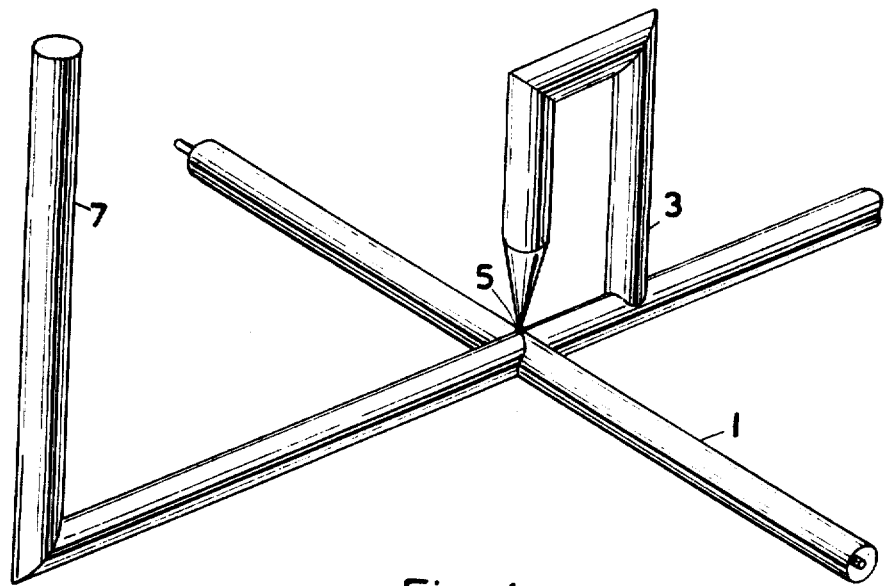
FIGURE 4 and FIGURE 5 are perspective drawings of alternative aerial elements.

FIGURE 4 is a perspective drawing of a suitable element for the aerial. A co-axial transmission line 1 feeds a folded unipole 3, the inner conductor of the transmission line 1 being connected to the unipole 3 through an orifice 5 having an insulating bushing. The transmission line 1 rests on the ground at the downwind end of the runway and transverse of the runway. A director element 7 is disposed one quarter wavelength away from the unipole 3 in a direction at right angles to the transmission line 1. A further director element (not shown) is disposed a quarter wavelength away from the unipole 3 in the opposite direction.

Figure 5:
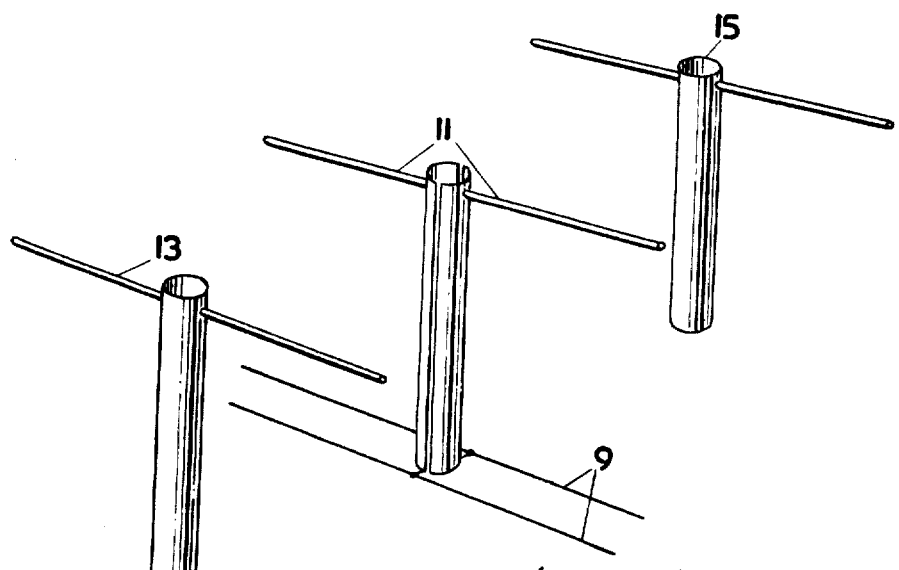

FIGURE 5 is a perspective drawing of an alternative element for such an aerial for transmitting a horizontally polarized signal. A parallel open wire transmission line 9 feeds a horizontal dipole 11. The transmission line 9 is disposed at the downwind end of the runway and transverse to the runway. Director elements 13 and 15 are disposed on opposite sides of the dipole 11, each a quarter wavelength away from said dipole 11 in a direction perpendicular to the transmission line 9.

In the case of FIGURE 4 or FIGURE 5, the complete aerial consists of an array of these elements equally spaced across the downwind end of the runway. The electrical distance between adjacent elements is slightly less than one wavelength. There is a consequent linear phase advance along the array which leads to the necessary deflection of the beam from the center line of the runway. One end of the array is fed wth the carrier signal modulated with the 90 c./s. frequency, and the other end of the array is fed with the carrier signal modulated with the 150 c./s. frequency. To improve the reflection characteristics of the ground, the areial may rest on wire netting.

Figure 6:
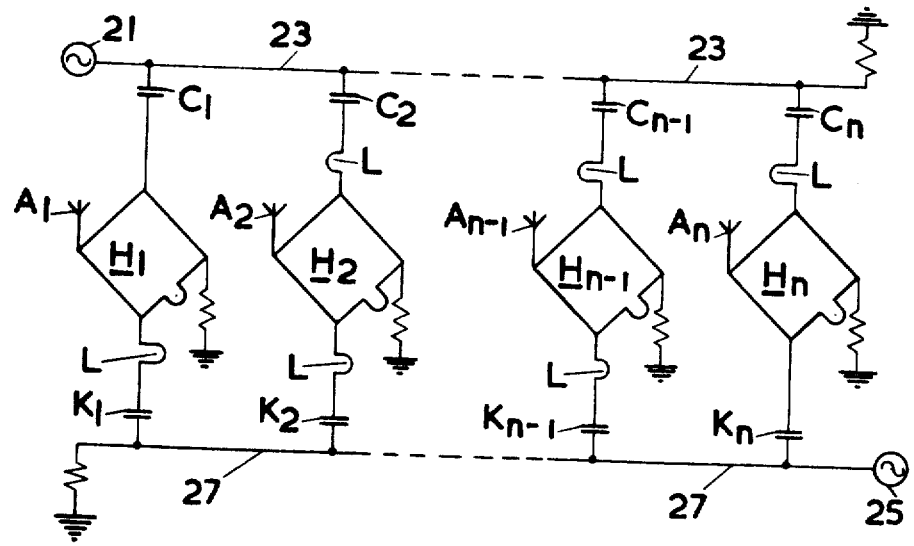
FIGURE 6 is a circuit diagram of an aerial array.

FIG. 6 is a circuit diagram of an aerial array arranged in accordance with a preferred embodiment of the present invention. A transmitter 21 transmitting on a frequency of between 108 mc./s. and 112 mc./s. modulated with a frequency of 90 c./s. feeds a co-axial transmission line, the inner conductor of which is labelled 23. A radiating aerial $A_1$ is fed, by means of a hybrid ring circuit $H_1$, with the signal from the conductor 23 via a coupling capacitor $C_1$. Similarly, other radiating elements $A_2$, ... $A_{n-1}$ and $A_n$ are fed, by means of hybrid ring circuits $H_2$, ... $H_{n-1}$ and $H_n$ respectively, with the signal from the conductor 23 via coupling capacitors $C_2$, ... $C_{n-1}$ and $C_n$ respectively. A second transmitter 25, transmitting on the same carrier frequency as the transmitter 21 but modulated with a 150 c./s. frequency, feeds a co-axial transmission line the inner conductor of which is labelled 27. The hybrid ring circuits $H_1$, $H_2$, ... $H_{n-1}$ and $H_n$ are fed from this conductor 27 via coupling capacitors $K_1$, $K_2$, ... $K_{n-1}$ and $K_n$ respectively. The actual lengths of wire in the bridging section between the conductors 23 and 27, respectively, and the hybrid ring circuits $H_1$, $H_2$, ... $H_{n-1}$ and $H_n$, are critical because they determine the phases of the signals fed to the hybrid ring circuits. The differences in the lengths of these bridging sections is shown diagrammatically by loops L inserted in them. It will be observed that the lengths of the bridging sections from the conductor 23 increase progressively from the hybrid ring circuit $H_1$ towards the hybrid ring circuit $H_n$ and the lengths of the bridging circuits from the conductor 27 increase progressively from the hybrid ring circuit $H_n$ towards the hybrid ring circuit $H_1$.

The action of the circuit is as follows. Each aerial, such as $A_2$, radiates a signal which is the sum of two components, one from the conductor 23 and the other from the conductor 27. The amplitudes of these components is determined by the choice of the coupling capacitors such as the capacitors $C_2$ and $K_2$, and the phases of the components are determined by the lengths of the respective bridging sections as shown diagrammatically by the loops L. The amplitudes and phases of the components applied to the individual aerial elements are arranged to be such that the control characteristic of the system is satisfactory at any point within the width of the runway and at all ranges within a given range. This is achieved by a 6-step process as follows:

(i) An appropriate aperture amplitude distribution is selected.

(ii) The resulting far-field polar diagram is computed.

(iii) From the result of (ii), the control characteristic required at an arbitrary distance from the aerial greater than the Rayleigh distance, for example 10,000 meters, is calculated. The control characteristic required in an I.L.S. system to meet I.C.A.O. specifications is laid down in those specifications.

(iv) From the result of (iii) above, the phase-gradient along the aperture that would yield the required control characteristic is calculated.

(v) A weighting function is applied to the selected amplitude distribution, so chosen as to give a suitable control characteristic at zero range. The weighting function may be linear. For an I.L.S. system conforming to I.C.A.O. specifications, the control characteristic at zero range is also specified.

(vi) Using the amplitude distribution selected in (i) above, but modified as in (iv) and (v) above, the control charatceristic at various ranges is computed.

If the resulting control characteristic obtained from (vi) above is unsatisfactory, a different aperture amplitude distribution is selected and the process is repeated.

An amplitude distribution which may be used is set out in the following table.

TABLE

| Component | Amplitude | Phase |
|---|---|---|
| $A_{90}(x)$ | $(1+mx)\exp(-kx^2)$ | $\frac{2\pi}{\lambda}\sin^{-1} Lx$ |
| $A_{150}(x)$ | $(1-mx)\exp(-kx^2)$ | $\frac{-2\pi}{\lambda}\sin^{-1} Lx$ |

The symbols in the above have the following meanings:

$A_{90}(x)$: the 90 c./s. modulated signal
$A_{150}(x)$: the 150 c./s. modulated signal
$x$: distance along the aerial array from the center line.
$\lambda$: wavelength of carried frequency
$k$, $L$, $m$: design parameters. The short-range properties are determined mainly by $m$ and the longe-range properties are determined mainly by $L$.

It will be seen from the above table that the two amplitude distributions are normal or Gaussian, weighted in a linear fashion in opposite senses in accordance with the distance along the aerial array from the center-line. In this way, the distributions are each made asymmetrical about the center-line of the array but they are asymmetrical in opposite senses. Since the weightings of the two amplitude distributions are equal except for the sign of the term $mx$, they will be symmetrical with respect to one another about the center-line of the array. The parameter $m$, therefore, governs the degree of asymmetry of the near-field strength of each of the signals while the parameter $k$ governs the beam width.

The phase distributions of the signal along the array is governed by the parameter L. If L is sufficiently small the phase change of a signal from element to element along the array will be linear. The parameter L determines the angle of split between the beams at ranges beyond the Rayleigh distance. If the aperture of the array is sufficiently large, the Rayleigh distance may be so great that all the guidance by the I.L.S. may be undertaken within the Rayleigh distance. In that case, the parameter L may be zero. That is to say, there may be no phase slip along the array in the signals fed to the elements.

Figure 7:
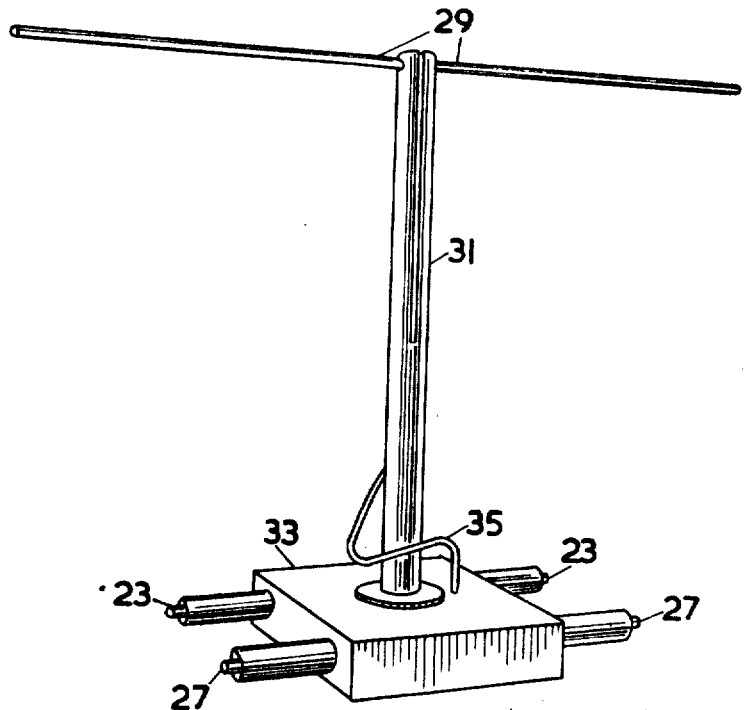
FIGURE 7 is a perspective drawing of an element of the aerial array whose circuit is shown in FIGURE 6.

FIG. 7 is a perspective drawing of an element of the aerial array whose circuit is shown in FIG. 6. A dipole 29, supported by a conducting tube 31, is mounted on a metal box 33. The box 33 is a convenient receptacle for the appropriate hybrid ring circuit (not shown). Co-axial transmission lines having center conductors 23 and 27 are mounted on the sides of the box 33. A co-axial cable 35 is used to convey the signal from the hybrid ring circuit (not shown) to the dipole 29. Director elements (not shown) are disposed on opposite sides of the dipole 29, each a quarter wave-length away in a direction perpendicular to the arms of the dipole 29. The complete aerial consists of an array of such elements equally spaced across the downwind end of the runway. The electrical distance between adjacent elements is slightly less than one wavelength. To improve the reception characteristics of the ground, the aerial array may rest on wire netting.

Figure 8:
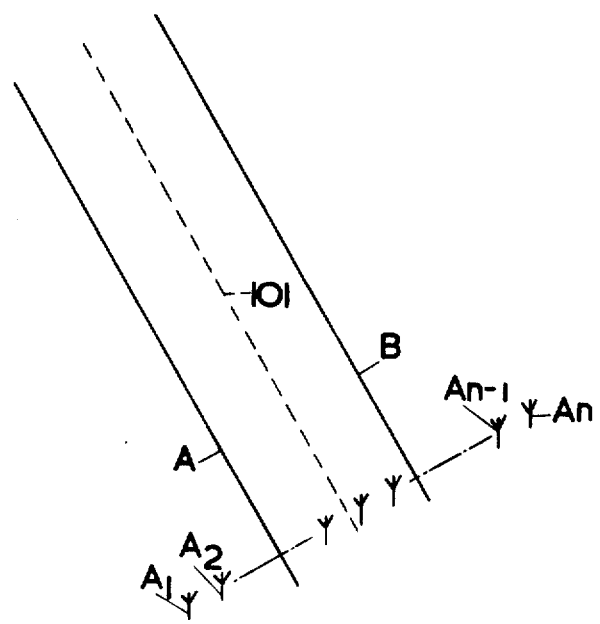
FIGURE 8 is a perspective view of an aerial array arranged transversely of an aircraft runway.

FIGURE 8 shows an array of aerial elements $A_1$ to $A_n$ (such as those shown in FIGURE 6) spaced transversely of a runway center-line 101. The edges of the runway are illustrated at A and B. Each aerial element may be of the form described with reference to FIGURE 4, 5 or 7. The aerial elements may be interconnected as described with reference to FIGURE 6. FIGURE 8 is purely illustrative of the general arrangement of such an array. Thus, for example, the drawing is not necessarily to scale and the number of aerial elements may be varied to meet any special requirements.

In any of the embodiments described, any suitable transmission line may be used, for example, a parallel open wire feeder, a coaxial transmission line or a waveguide. In the foregoing specification and in the following claims the expression "transmission line" includes all such suitable transmission lines.

I claim:

1. An aircraft approach system comprising a transmitter aerial array having radiator elements spaced transversely of an aircraft runway center-line, signal means generating two differently modulated signals, and signal distribution means operatively connecting said signal means to said radiator elements for distributing the said signals to said radiator elements so that the amplitude distribution of one of said signals to said radiator elements is asymmetrical in one sense about the center-line of said array and so that the amplitude distribution of the other of said signals to said radiator elements is asymmetrical in the opposite sense about said center-line, the two said amplitude distributions being symmetrical with respect to one another about said center-line.

2. An aircraft approach system as claimed in claim 1 wherein each of said elements is separated from the next by an electrical distance slightly less than the wavelength of the carrier frequency of the transmitted signal.

3. An aircraft approach system as claimed in claim 2 wherein said aerial array is end-fed from both ends, a separate one of the said two signals being applied to each end.

4. An aircraft approach system as claimed in claim 1 wherein said signal distribution means comprises a pair of transmission lines operatively connected to the said elements, each of said transmission lines carrying a separate one of said two signals respectively, and coupling means between said transmission lines and said elements arranged to control the amplitude and phase of each of the signals applied to each element.

5. An aircraft approach system as claimed in claim 1 wherein said signal distribution means comprises first distribution means operatively coupling said signal means to said radiator elements for applying one of said signals to said radiator elements with an amplitude distribution which is asymmetrical in one sense about said center-line, and second distribution means operatively coupling said signal means to said radiator elements for applying the other of said signals to said radiator elements with an amplitude distribution which is asymmetrical is the opposite sense about said center-line.

6. An aircraft approach system as claimed in claim 1 wherein said signal distribution means comprises a first transmission line connected to said signal means, a first plurality of coupling means operatively connecting said first transmission line to individual ones of said radiator elements for applying one of said signals to said radiator elements with an amplitude distribution which is asymmetrical in one sense about said center-line, a second transmission line connected to said signal means, and a second plurality of coupling means operatively connecting said second transmission line to individual ones of said radiator elements for applying the other of said signals to said radiator elements with an amplitude distribution which is asymmetrical in the opposite sense about said center-line.

7. An aircraft approach system as claimed in claim 6 wherein said first plurality of coupling means and said second plurality of coupling means comprise a plurality of hybrid ring circuits coupled to said radiator elements respectively, and a plurality of capacitors of different capacity values connected between tappings on said transmission lines and said hybrid ring circuits.

8. An aircraft approach system as claimed in claim 7 wherein said tappings are positioned to vary the phase of said one of said signals substantially linearly in one sense along the array and to vary the phase of said other of said signals substantially linearly in the opposite sense along the array.

9. An aircraft approach system comprising a transmitter aerial array having radiator elements spaced transversely of an aircraft runway center-line, signal means generating two differently modulated signals, and signal distribution means operatively connecting said signal means to said radiator elements for distributing said signals to said radiator elements so that the amplitude distribution to said radiator elements of one of said signals is a Gaussian distribution weighted in one sense by a function of the distance of each said radiator element from the center-line of said array and the amplitude distribution to said radiator elements of the other of said signals is a Gaussian distribution similarly weighted in the opposite sense by a function of the distance of each said radiator element from said center-line.

10. An aerial array as claimed in claim 9 in which each said radiator element is spaced from the next by an electrical distance slightly less than the wavelength of the carrier frequency of the transmitted signal.

11. An aerial array in an aircraft approach system for transmitting two differently modulated signals, comprising signal generating means for generating said two differently modulated signals, an array of radiator elements spaced in a substantially straight line, and signal distribution means connected to said signal generating means and to said radiator elements for distributing said signals to said radiator elements so that the amplitude distribution of one said signal to said radiator elements is asymmetrical in one sense about the center-line of the array and so that the amplitude distribution of the other said signal to said radiator elements is asymmetrical in the opposite sense about said center-line, the two said amplitude distributions being symmetrical with respect to one another about the said center-line.

12. An aerial array as claimed in claim 11 in which each said radiator element is spaced from the next by an electrical distance slightly less than the wavelength of the carrier frequency of the transmitted signal.

13. An aerial array as claimed in claim 11 wherein said signal distribution means comprises first signal distribution means operatively connecting said signal generating means to said radiator elements for applying one of said signals to said radiator elements with an amplitude distribution which is asymmetrical in one sense about said center-line, and second signal distribution means operatively connecting said signal generating means to said radiator elements for applying the other said signals to said radiator elements with an amplitude distribution which is asymmetrical is the opposite sense about said center-line.

14. An aerial array as claimed in claim 11 wherein the said signal distribution means comprises a first transmission line connected to said signal generating means, a first plurality of coupling means operatively connecting said first transmission line to individual ones of said radiator elements for applying one of said signals to said radiator elements with an amplitude distribution which is asymmetrical in one sense about said center-line, a second transmission line connected to said signal generating means, and a second plurality of coupling means operatively connecting said second transmission line to individual ones of said radiator elements for applying the other of said signals to said radiator elements with an amplitude distribution which is asymmetrical in the opposite sense about said center-line.

15. An aerial array as claimed in claim 14 including hybrid ring circuits coupled to said radiator elements, said first plurality of coupling means and said second plurality of coupling means including capacitors of different capacity values connected between tappings on said transmission lines and said hybrid ring circuits.

16. An aerial array as claimed in claim 15 wherein said tappings are so spaced from one another as to vary the phase of said one of said signals substantially linearly in one sense along the array and to vary the phase of said other of said signals substantially linearly in the opposite sense along the array.

17. An aerial array as claimed in claim 16 in which each element is spaced from the next by an electrical distance slightly less than the wavelength of the carrier frequency of the transmitted signal.

18. An aerial array for transmitting two signals having the same carrier frequency but differently modulated in an aircraft approach system, said array including a plurality of aerial elements spaced in a straight line, a plurality of hybrid ring circuits each connected to a separate one of the elements, and two transmission lines operatively coupled to said hybrid ring circuits, the coupling between said transmission lines and said hybrid ring circuits being such as to give an amplitude distribution of one of said two signals of substantially $$(1+mx) \exp. (-kx^2)$$

with a phase distribution of substantially $$\frac{2\pi}{\lambda} \sin^{-1} Lx$$

and to give an amplitude distribution of the other of said two signals of substantially $(1-mx) \exp. (-kx^2)$ with a phase distribution of substantially $$-\frac{2\pi}{\lambda} \sin^{-1} Lx$$

where $x$ is the distance of an element along the aerial array measured from the center, $\lambda$ is the wavelength of the carrier frequency, $\pi$ is the ratio between the circumference and the diameter of a circle, and $m$, $k$, and $L$ are constants.

19. An aircraft approach system comprising a transmitter aerial array having radiator elements spaced transversely of an aircraft runway center-line, signal means generating two differently modulated signals, and signal distribution means operatively connecting said signal means to said radiator elements for distributing said signals to said radiator elements so that the amplitude distribution to said radiator elements of one of said signals is a Gaussian distribution weighted in one sense by a linear function of the distance of each said radiator element from the center-line of said array and the amplitude distribution to said radiator elements of the other of said signals is a Gaussian distribution similarly weighted in the opposite sense by a linear function of the distance of each said radiator element from said center-line.

20. An aircraft approach system as claimed in claim 19 wherein said signal distribution means is constructed to vary the phase of one of said signals substantially linearly in one sense along said array, and to vary the phase of the other of said signals substantially linearly in the opposite sense along said array.

21. An aerial array in an aircraft approach system for transmitting two differently modulated signals, comprising an array of radiator elements spaced in a substantially straight line, and signal distribution means connected to said radiator elements for distributing said signals to said radiator elements so that the amplitude distribution to said radiator elements of one of said signals is a Gaussian distribution weighted in one sense by a linear function of the distance of each radiator element from the center-line of said array and the amplitude distribution to said radiator elements of the other of said signals is a Gaussian distribution similarly weighted in the opposite sense by a linear function of the distance of each said radiator element from said center-line.

22. An aerial array as claimed in claim 21 wherein said signal distribution means is constructed to vary the phase of one of said signals substantially linearly in one sense along said array and to vary the phase of the other of said signals substantially linearly in the opposite sense along said array.

23. An aircraft approach system comprising a transmitter aerial array having radiator elements spaced transversely of an aircraft runway, signal means generating two differently modulated signals, and signal distribution means operatively connecting said signal means to said radiator elements for distributing said signals to said radiator elements to give an amplitude distribution of one of said two signals of substantially $(1+mx) \exp. (-kx^2)$ with a phase distribution of substantially $$\frac{2\pi}{\lambda} \sin^{-1} Lx$$

and to give an amplitude distribution of the other of said two signals of substantially $(1-mx) \exp. (-kx^2)$ with a phase distribution of substantially $$-\frac{2\pi}{\lambda} \sin^{-1} Lx$$

where $x$ is the distance of an element along the aerial array measured from the center, $\lambda$ is the wavelength of the carrier frequency, $\pi$ is the ratio between the circumference and the diameter of a circle, and $m$, $k$, and $L$ are constants.

24. An aerial array in an aircraft approach system having means for transmitting two differently modulated signals, comprising an array of radiator elements spaced in a substantially straight line, and signal distribution means connected to said radiator elements for distributing said signals to said radiator elements to give an amplitude distribution of one of said two signals of substantially $(1+mx) \exp. (-kx^2)$ with a phase distribution of substantially $$\frac{2\pi}{\lambda} \sin^{-1} Lx$$

and to give an amplitude distribution of the other of said two signals of substantially $(1-mx) \exp. (-kx^2)$ with a phase distribution of substantially $$-\frac{2\pi}{\lambda} \sin^{-1} Lx$$

where $x$ is the distance of an element along the aerial array measured from the center, $\lambda$ is the wavelength of the carrier frequency, $\pi$ is the ratio between the circumference and the diameter of a circle, and $m$, $k$ and $L$ are constants.

References Cited by the Examiner

UNITED STATES PATENTS

| | | | |
|---|---|---|---|
| 2,293,694 | 8/1942 | Alford | 343—107 |
| 2,404,400 | 7/1946 | Pickles | 343—109 |
| 2,436,823 | 3/1948 | Pickles | 343—107 |
| 2,848,714 | 9/1958 | Ring. | |

CHESTER L. JUSTUS, *Primary Examiner.*

H. C. WAMSLEY, *Assistant Examiner.*